March 26, 1940.     H. S. JANDUS     2,195,313
FRICTION BRAKE LEVER
Filed Dec. 17, 1938
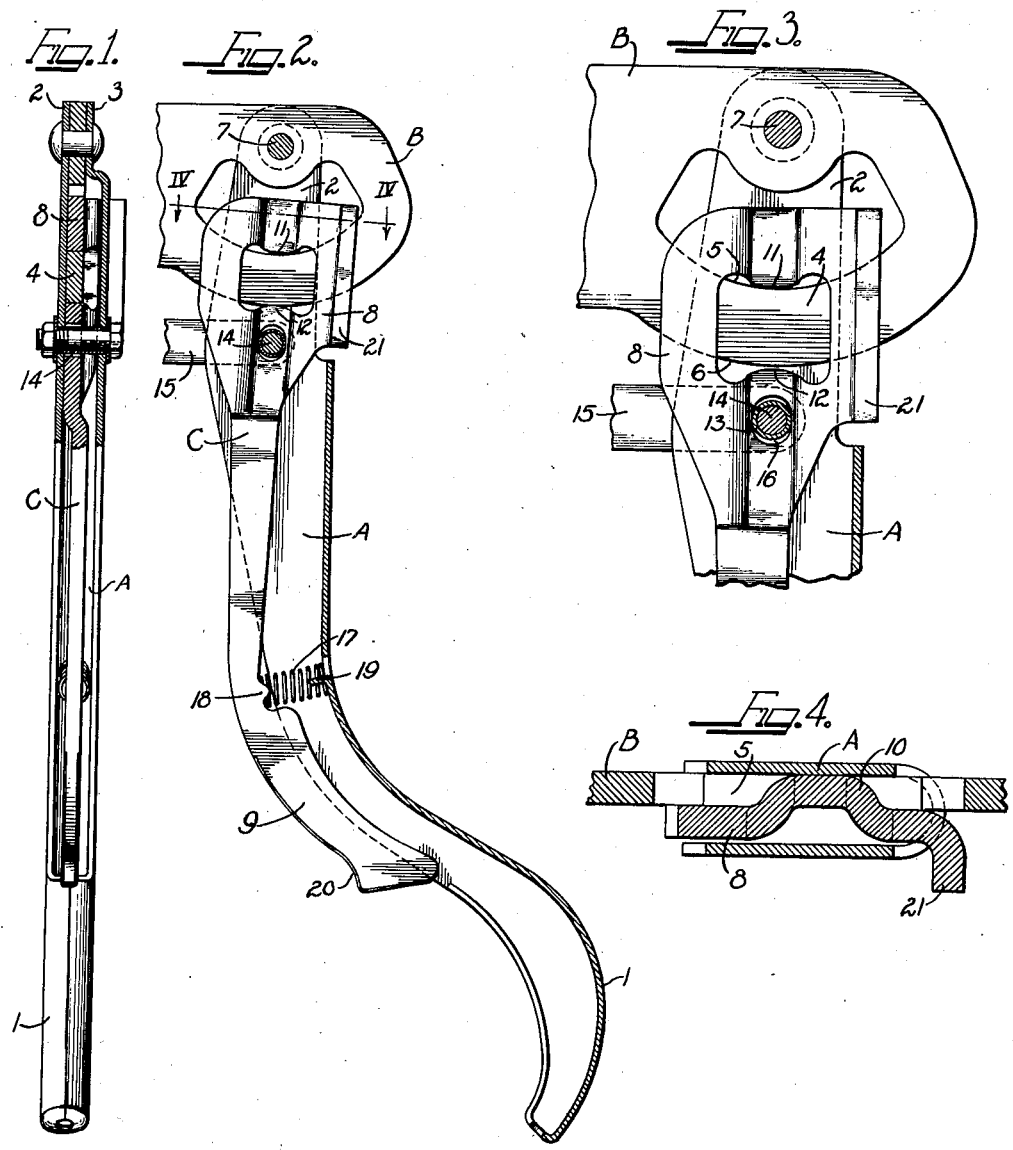
Inventor
HERBERT S. JANDUS Patented Mar. 26, 1940

2,195,313

UNITED STATES PATENT OFFICE 2,195,313

FRICTION BRAKE LEVER

Herbert S. Jandus, Detroit, Mich., assignor to Houdaille-Hershey Corporation, Detroit, Mich., a corporation of Michigan Application December 17, 1938, Serial No. 246,335

6 Claims. (Cl. 74—531)

The present invention relates to friction brake levers and more particularly to one suitably adapted as an emergency brake lever for an automotive vehicle.

An object of the present invention is to provide a friction type brake lever comprising a minimum number of parts, and which may be economically manufactured and assembled and which at the same time is efficient in service.

Another object of the present invention is to provide a brake lever arranged to be manufactured on a quantity basis and of such a character that close tolerances of manufacture, are reduced to a minimum.

A further object of the present invention is to provide a friction type brake lever in which the holding effect of the friction clutch parts is in excess of any load required from a commercial standpoint, as respects automotive brake lever construction.

A still further object of the present invention is to provide a friction type brake lever in which a locking member and a clutch releasing member are integral and formed as a one-piece stamping.

A still further object of the present invention is to provide a hand brake lever construction for automotive vehicles in which the support, the lever member, the one-piece locking member and release member are formed as stampings and which may readily be assembled in operative relation.

The invention has for a further object the provision of a hand brake lever mechanism wherein the major parts are formed from sheet metal as stampings, thereby effecting substantial reduction in the cost of manufacture and assembly, and enhancing the interchangeability and uniformity of parts.

The invention has for an additional object the provision of a hand brake lever construction of such character that close manufacturing tolerances are required in connection with but two dimensions.

The invention has for a further object the provision of a hand brake lever of stamped metal wherein a locking dog is formed as a stamping and which is reinforced to eliminate flat bending incidental to service.

The above, other and further objects of the invention will be apparent from the following description and accompanying drawing.

The accompanying drawing illustrates an embodiment of the present invention and the views thereof are as follows:

Figure 1 is a view partially in edge elevation and partially in section of a brake lever constructed to embody the principles of the present invention.

Figure 2 is a view partially in side elevation and partially in longitudinal central section, of a lever embodying the principles of the present invention, and showing the parts in clutched relation.

Figure 3 is a fragmental enlarged view of the fulcrum end of the lever of Figure 2, showing the parts in unclutched relation.

Figure 4 is a sectional view taken substantially in the plane indicated by line IV—IV of Figure 2.

The drawing will now be explained.

A lever member A is illustrated as stamped from flat metal provides a body portion which is U-shaped for the major portion of its length, and a hollow closed grip portion 1 with spaced legs 2 and 3 at the other end, which are formed as continuations of the side walls of the body portion.

A support or bracket is stamped from flat metal, and fashioned to provide a sector 4 having concentric clutching surfaces 5 and 6. These clutching surfaces are described by radii having a center in the axis of the pivot 7 which pivotally connects the lever member A to the support B. A fragmental portion of the support as here shown, has the end thereof which is attached to the vehicle behind the instrument board, varied in accordance with various car manufacturers, and forms no part of the present invention.

A stamping C is fashioned to provide a locking member 8 and a clutch release member 9, the members 8 and 9 being parts of a single instrumentality, to-wit, the stamping C.

The locking member 8 is formed with a laterally extending off-set or bulged portion 10 which is apertured to receive the sector 4. In the formation of the aperture the upper and lower margins thereof are formed with projections 11 and 12, which extend towards each other and are adapted to engage respectively with the concave and convex concentric surfaces of the sector 4 in frictional holding engagement to clutch the lever in adjusted position.

Preferably the surfaces of the projections 11 and 12 are rounded, sufficiently to prevent damage to the concentric surfaces of the sector when the lever is in clutched engagement and a braking load is imposed on the lever.

The construction of the extremities of the projection and the characteristics of the metal used, is such as to provide a friction type brake lever in which indenting of the concentric surfaces of the sector is practically eliminated thus enabling the use of the lever for a long period of time.

The side walls of the lever are apertured to receive a tubular pivot member 13 which pivotally mounts the one-piece stamping C on the lever, the stamping C being arranged to work between the side walls of the body of the lever member. A bolt, or rivet, or other pivot member, 14 passes through the tubular pivot member 13 and has connected to it a clevis 15 which is operatively connected to the brake rigging in the vehicle, to thereby attach the brake rigging to the brake lever.

The locking member 8 is provided with an elongated aperture 16 for receiving the tubular pivot 13 for slight bodily movement of the locking member with respect to the lever member as the locking member is moved into and out of clutching engagement with the sector bore.

In order to maintain the locking member 8 tilted sufficiently to cause it to frictionally engage the sector with holding action, a spring 17 is utilized. The spring is herein illustrated as a coiled spring with one end against the web of the body of the lever member and the other end against the adjacent edge of the clutch release member 9, the latter being formed to provide a detent 18 which enters the adjacent end of the spring to prevent its displacement in service. The other end of the spring is retained against displacement by means of a lug 19 struck out of the web of the lever member and turned inwardly, as illustrated in Figure 2.

The grip end of the clutch releasing member 9 terminates adjacent the upper end of the grip portion 1 of the lever member for fore-finger operation. A slight depression 20 is formed in the clutch releasing member to provide finger space for the operator's finger.

In order to prevent flat bending, or other distortion of the locking member 8, incidental to service, a flange 21 is formed thereon arranged at an angle to the plane of the locking member, as illustrated. The presence of this flange strengthens the locking member so that a strain imposed on the bulged portion carrying the projections 11 and 12 incidental to brake pull, does not spread the projections 11 and 12, but instead maintains the locking member strong and rigid. This fact maintains the distance between the confronting convex surfaces of the projections 11 and 12, uniform. Were no such provision made, it might so happen that the distance between these projections would increase, due to flexing or bending of some portion of the locking member incidental to service, which would thus require greater rocking or tilting movement of the locking member to frictionally hold the lever in adjusted position.

This disadvantage has been overcome by the construction described.

The formation of the bulge or off-set portion 10 increases the strength of the locking member with respect to the projections 11 and 12.

The lever of the present invention has been illustrated as a dash or cowl type arrangement of a lever, that is to say, it is fulcrumed behind the instrument board of a vehicle, with a grip portion depending and available from below the instrument board. It is to be understood, of course, that the construction of the present invention may be utilized with any other type of lever, as will readily be understood by anyone skilled in the art.

The arrangement shown in Figure 2 depicts the parts with the lever in clutching engagement with the sector and the projections 11 and 12 in frictional binding engagement with the concentric surfaces 5 and 6 of the sector.

To release the lever from the position shown in Figure 2, and swing it to the left, the operator grasps the grip portion 1 of the lever and with his forefinger about the recess 29 of the clutch release member 9 squeezes the clutch release member which rocks the locking member 8 about its pivotal connection to the lever member, to the position shown in Figure 3, which unclutches the locking member from the sector and enables movement of the lever to the left.

It is quite apparent that if the grip portion 1 of the lever member be grasped and pulled to the right, as viewed in Figure 2, such movement would unclutch the locking member as there would then be a tendency to swing the locking member about the projection 11 thus bringing the projection 12 from holding engagement with the convex surface 6 of the sector.

The locking member 8 remains in frictional binding engagement with the concentric surfaces of the sector 4 by reason of the pull imposed on the lever member A by the brake mechanism attached to the clevis 15 thus tending to urge the lever member to the left, as viewed in Figures 2 and 3. Such tendency of the lever member to move, will cause the locking member 8 to have a tendency to swing about the upper projection 11 in clockwise direction thereby urging the lower projection 12 into tight holding engagement with the convex surface 6 of the sector, thus increasing the binding effect between the locking member and the sector and firmly holding the lever member in its then adjusted position.

It will be observed that the lever of the present invention contemplates three stamped parts, to-wit, the support or bracket, the lever member, and the one-piece locking member and clutch release member. In addition only four other pieces are necessary, to-wit, the spring, the tubular pivot member, the pivot member 14 and the attaching pivot 7.

There are only two dimensions which require close manufacturing tolerances, namely, the locking member 8 and the sector bar, that is the concentric surfaces 5 and 6 of the sector. It will be readily apparent that because of the reduction of manufacturing tolerances to a minimum, the lever of the present invention may be manufactured in quantity lots at low manufacturing costs.

The sector and the member C might be made of special steel, however, it has been found that suitable commercial steel may be utilized with the frictional parts carburized, which has been found to be very satisfactory in service in preventing deformation of the friction or clutching parts.

The contours given to the convex faces of the projections 11 and 12 are such as to prevent the formation of any ridges or indentations in the concentric surfaces of the sector, thereby eliminating a drawback which has been present in friction brake levers of recent times, to-wit, formation of indentations in the sector which remove the frictional holding engagement and makes it a modified pawl and ratchet engagement, between the clutching member on the lever and the sector on the support or bracket.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. A brake lever construction including a stamped metal lever member of U-shaped cross-section for a major portion of its length having a grip portion at one end and spaced legs at the other end, a stamped metal attaching bracket or support having an integral part formed as an arcuate bar with concentric edges, said lever member being pivoted to said support with its legs astraddle said bar, a stamped metal combination one-piece member comprising a locking dog element and a dog release element pivoted between the side walls of said lever member with the plane of the major portion of the dog parallel to the bar and between the bar and the adjacent lever member leg, said locking dog element having a central portion laterally offset and provided with cam surfaces in register with the concentric edges of said bar, and spring means normally biasing said combination member to effect locking engagement of said dog with said bar to hold said lever member in adjusted position.

2. A control device comprising in combination, a support comprising a stamping formed to provide a lever pivot portion and an arcuate bar portion with concentric edges with said portions coplanar, a lever comprising a stamping formed to provide a hand grip portion at one end and spaced legs at the other end and an intermediate shank portion of U-shaped cross-section, said lever being pivoted to said support with said legs astraddle said bar and pivoted to said pivot portion of said support, a dog and release member comprising a one-piece stamping formed to provide a locking dog portion and a dog release portion arranged and pivoted within the said shank portion of said lever, said dog having a longitudinal depression therein with the web thereof formed to provide facing projections in register with the bar edges, and said one-piece dog and release member being normally spring biased to cause frictional holding engagement of said projections with said bar.

3. A device as specified in claim 2 in which the dog release portion partially projects from the interior of the lever member adjacent the grip portion thereof to present the manipulating portions available for rocking movement into the lever to release the dog.

4. A device as specified in claim 2 in which said dog and release member extend lengthwise of said lever member between its side walls, the locking dog projecting outwardly of the side margins of the legs and the manipulating portion of the release portion partially projecting outwardly of the side walls of the lever adjacent the grip portion of the same, one of the outwardly projecting portions of the dog being bent to form a longitudinally extending flange to rigidify said dog against flat bending.

5. A device as specified in claim 2 with the locking dog portion and dog release portion relatively offset longitudinally to position said dog between one leg of said lever member and said bar and to position the release portions substantially midway between the sidewalls of the lever shank, the biasing of said one-piece dog and release member to holding relation with the bar causing the projection of the manipulating portion of the release member, said manipulating portion being rockable into the lever member to effect disengagement of the locking dog and bar.

6. A brake lever construction including a stamped metal lever member having a grip portion at one end and spaced legs at the other end, a stamped metal attaching bracket or support having an integral part formed as an arcuate bar with concentric edges, said lever member being pivoted to said support with its legs astraddle said bar, a stamped metal locking dog element pivoted to said lever member with the plane of the major portion of the dog parallel to the bar and between the bar and the adjacent lever member leg, said locking dog element having a longitudinal depression therein with the web thereof formed to provide facing projections in register with the bar edges, and spring means normally biasing said locking dog member to effect locking engagement of said dog with said bar to hold said lever member in adjusted position.

HERBERT S. JANDUS.